US009233673B2

(12) United States Patent
Ohkubo et al.

(10) Patent No.: US 9,233,673 B2
(45) Date of Patent: Jan. 12, 2016

(54) BBW BRAKE DEVICE (75) Inventors: Naoto Ohkubo, Wako (JP); Takashi Nishioka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 101 days.

(21) Appl. No.: 13/259,485

(22) PCT Filed: Apr. 14, 2010

(86) PCT No.: PCT/JP2010/056661
§ 371 (c)(1),
(2), (4) Date: Dec. 1, 2011

(87) PCT Pub. No.: WO2010/119889
PCT Pub. Date: Oct. 21, 2010

(65) Prior Publication Data
US 2012/0062023 A1    Mar. 15, 2012

(30) Foreign Application Priority Data
Apr. 14, 2009  (JP) .................................. 2009-097910

(51) Int. Cl.
*B60T 8/17*    (2006.01)
*B60T 8/1755*    (2006.01)
*B60T 7/04*    (2006.01)
(Continued)

(52) U.S. Cl.
CPC .............. *B60T 8/1755* (2013.01); *B60T 7/042* (2013.01); *B60T 8/4081* (2013.01); *B60T 13/745* (2013.01); *B60T 2270/82* (2013.01)

(58) Field of Classification Search
CPC . B60T 8/04013; B60T 8/4072; B60T 8/4077; B60T 8/4827; B60T 8/4836; B60T 8/4266; B60T 7/042; B60T 13/745; B60T 817/55

USPC ......... 303/10, 11, 114.1, 114.2, 115.2, 117.1, 303/140, 146, 155; 60/567
See application file for complete search history.

(56) References Cited

U.S. PATENT DOCUMENTS 5,576,959 A * 11/1996 Hrovat et al. .................. 701/70
5,769,509 A   6/1998 Feigel et al.
6,584,399 B2 * 6/2003 Koibuchi ........................ 701/90
(Continued)

FOREIGN PATENT DOCUMENTS

EP       2 671 769 A    12/2013
JP    2001-106051 A     4/2001
(Continued)

*Primary Examiner* — Bradley King
*Assistant Examiner* — Stephen Bowes
(74) *Attorney, Agent, or Firm* — Carrier Blackman & Associates, P.C.; Joseph P. Carrier; William D. Blackman (57) ABSTRACT A brake fluid pressure electrically generated by a slave cylinder (23) in accordance with an operation amount by a brake pedal (12) is supplied via a VSA system (24) to wheel cylinders (16, 17; 20, 21) provided respectively for wheels. This enables smooth braking by the wheel cylinders (16, 17; 20, 21) by using a brake fluid pressure pressurized by the slave cylinder (23) and including little pulsation. When the VSA system (24) is to individually control the brake fluid pressures supplied respectively to the wheel cylinders (16, 17; 20, 21) to control vehicle behavior, the slave cylinder (23) generates a brake fluid pressure corresponding to a total of the brake fluid pressures required for the wheel cylinders (16, 17; 20, 21). This configuration allows the slave cylinder (23) to generate a brake fluid pressure in just proportion.

10 Claims, 8 Drawing Sheets (51) Int. Cl.
B60T 8/40 (2006.01)
B60T 13/74 (2006.01)

(56) References Cited

U.S. PATENT DOCUMENTS

| | | | |
|---|---|---|---|
| 6,668,634 B1 | 12/2003 | Zimmermann et al. | |
| 7,567,863 B2* | 7/2009 | Suzumura et al. | 701/42 |
| 8,346,453 B2* | 1/2013 | Ishimoto | 701/70 |
| 2003/0038541 A1 | 2/2003 | Suzuki et al. | |
| 2003/0111896 A1* | 6/2003 | Imamura et al. | 303/11 |
| 2007/0273204 A1 | 11/2007 | Kodama et al. | |
| 2008/0223675 A1 | 9/2008 | Hatano | |
| 2009/0026835 A1* | 1/2009 | Matsubara et al. | 303/15 |
| 2013/0232965 A1 | 9/2013 | Ohnishi et al. | |

FOREIGN PATENT DOCUMENTS

| | | |
|---|---|---|
| JP | 2003-063367 A | 3/2003 |
| JP | 2005-343366 A | 12/2005 |
| JP | 2006-335146 A | 12/2006 |
| JP | 2007-302120 A | 11/2007 |
| JP | 2008-062782 A | 3/2008 |
| JP | 2008-110633 A | 5/2008 |
| JP | 2008-221995 A | 9/2008 |
| WO | 94/25322 A1 | 11/1994 |
| WO | 96/14228 A1 | 5/1996 |
| WO | 2004/089712 A1 | 10/2004 |
| WO | 2012-067191 A1 | 5/2012 |
| WO | 2012/105526 A1 | 8/2012 |

\* cited by examiner

BBW BRAKE DEVICE

TECHNICAL FIELD

The present invention relates to a BBW brake device including: wheel cylinders provided respectively to wheels and each configured to generate a braking force by using a brake fluid pressure; brake-operation-amount detection means for detecting an amount of brake operation by a driver; electric brake-fluid-pressure generation means for supplying, to the wheel cylinders, a brake fluid pressure electrically generated in accordance with the amount of brake operation; and brake-fluid-pressure control means, disposed between the electric brake-fluid-pressure generation means and the wheel cylinders, for individually controlling brake fluid pressures supplied to the wheel cylinders.

BACKGROUND ART

Such a BBW (brake by wire) brake device has already been known from Patent Document 1 below.

In this BBW brake device, a slave cylinder is caused to generate a brake fluid pressure corresponding to a braking force required by a driver: by carrying out a map search for a brake fluid pressure to be generated by the slave cylinder, on the basis of a pedal stroke of a brake pedal depressed by the driver; applying this brake fluid pressure to a brake-fluid-pressure/slave-cylinder-stroke map based on load fluid loss characteristics to thereby convert the brake fluid pressure to a piston stroke of the salve cylinder, and performing a feedback control for a rotation angle of an electric motor of an actuator for the slave cylinder so as to generate the piston stroke.

Patent Document 1: Japanese Patent Application Laid-open No. 2008-110633

DISCLOSURE OF INVENTION

Problems to be Solved by the Invention

Incidentally, in a case of providing, between a slave cylinder and wheel cylinders for wheels in a BBW brake device of this type, brake fluid pressure control means such as a VSA (vehicle stability assist) system for controlling a yaw moment of the vehicle by individually controlling brake fluid pressures supplied respectively to the wheel cylinders during a non-braking state in which the driver does not depress the brake pedal, a brake fluid pressure generated by a fluid pressure pump provided in the VSA system pulsates. Due to the pulsation, the BBW brake device has a problem of being difficult to provide smooth braking using the wheel cylinders.

The present invention has been made in view of the above-described circumstances, and an object thereof is to enable smooth braking by preventing a brake fluid pressure from pulsating, when brake fluid pressure control means individually controls brake fluid pressures supplied respectively to wheel cylinders in a BBW brake device.

Means for Solving the Problems

In order to attain the above object, according to a first aspect of the present invention, there is proposed a BBW brake device including: wheel cylinders provided respectively to wheels and each configured to generate a braking force by using a brake fluid pressure; brake-operation-amount detection means for detecting an amount of brake operation by a driver; electric brake-fluid-pressure generation means for supplying, to the wheel cylinders, a brake fluid pressure electrically generated in accordance with the amount of brake operation; and brake-fluid-pressure control means, disposed between the electric brake-fluid-pressure generation means and the wheel cylinders, for controlling vehicle behavior by individually controlling brake fluid pressures supplied to the wheel cylinders, characterized in that when the brake-fluid-pressure control means is in operation, a brake fluid pressurized by the electric brake-fluid-pressure generation means is supplied to the brake-fluid-pressure control means.

Furthermore, according to a second aspect of the present invention, in addition to the first aspect, there is proposed the BBW brake device, wherein the electric brake-fluid-pressure generation means generates a brake fluid pressure corresponding to a total of brake fluid pressures required for the plurality of wheel cylinders.

Moreover, according to a third aspect of the present invention, in addition to the first or second aspect, there is proposed the BBW brake device, wherein at least one of the wheel cylinders is provided to one of the wheels that is capable of regenerative braking.

Furthermore, according to a fourth aspect of the present invention, in addition to any one of the first to third aspects, there is proposed the BBW brake device, wherein the electric brake-fluid-pressure generation means generates a brake fluid pressure corresponding to a value obtained by adding a total of brake fluid pressures required for the plurality of wheel cylinders and a fluid pressure corresponding to a highest one of the brake fluid pressures required for the plurality of wheel cylinders.

Moreover, according to a fifth aspect of the present invention, in addition to the third aspect, there is proposed the BBW brake device, wherein the wheel capable of regenerative braking is each of right and left front wheels or each of right and left rear wheels, and the electric brake-fluid-pressure generation means is connected to the wheel cylinders that are on a front-wheel side and the wheel cylinders that are on a rear-wheel side individually through separate fluid paths.

Furthermore, according to a sixth aspect of the present invention, in addition to any one of the first to fifth aspects, there is proposed the BBW brake device, wherein the brake-fluid-pressure control means includes: a regulator valve configured to regulate the brake fluid pressure generated by the electric brake-fluid-pressure generation means; and a control valve capable of independently controlling the brake fluid pressure regulated by the regulator valve.

Here, a slave cylinder 23 of embodiments corresponds to the electric brake-fluid-pressure generation means of the present invention; a VSA system 24 of the embodiments corresponds to the brake-fluid-pressure control means of the present invention; and a stroke sensor Sa of the embodiments corresponds to the brake-operation-amount detection means of the present invention.

Effects of the Invention

According to the first aspect of the present invention, when the brake-operation-amount detection means detects the amount of brake operation by the driver, the brake fluid pressure generated in accordance with the brake operation amount by the electric brake-fluid-pressure generation means is supplied to the wheel cylinders provided respectively for the wheels. When the brake-fluid-pressure control means is to individually control the brake fluid pressures supplied respectively to the wheel cylinders to control vehicle behavior, the brake fluid pressure pressurized by the electric brake-fluid-pressure generation means and including little pulsation is supplied to the brake-fluid-pressure control means. This configuration enables smooth braking by the wheel cylinders.

Moreover, according to the second aspect of the present invention, the electric brake-fluid-pressure generation means generates a brake fluid pressure corresponding to the total of the brake fluid pressures required for the wheel cylinders. This configuration allows the electric brake-fluid-pressure generation means to generate a brake fluid pressure in just proportion.

Moreover, according to the third aspect of the present invention, when the brake-fluid-pressure control means individually controls the brake fluid pressures supplied respectively to the wheel cylinders so that the total of a regenerative braking force and a fluid pressure braking force would be equal to a required value, the electric brake-fluid-pressure generation means generates the brake fluid pressure corresponding to the total of the brake fluid pressures required for the wheel cylinders. This configuration allows the electric brake-fluid-pressure generation means to generate a brake fluid pressure in just proportion.

Moreover, according to the fourth aspect of the present invention, the electric brake-fluid-pressure generation means generates the brake fluid pressure corresponding to a value obtained by adding the total of the brake fluid pressures required for the wheel cylinders and the brake fluid pressure corresponding to the highest one of the brake fluid pressures required for the wheel cylinders. With this configuration, fluid loss due to deformation of cup seals, bulges of a brake line or the like can be compensated, and a necessary and sufficient brake fluid pressure can be generated.

Moreover, according to the fifth aspect of the present invention, the wheel capable of regenerative braking is each of the right and left front wheels or each of the right and left rear wheels, and the electric brake-fluid-pressure generation means is connected individually to the wheel cylinders on the front-wheel side and the wheel cylinders on the rear-wheel side through the separate fluid paths. With this configuration, by performing VSA control in a state where the right and left front wheels are paired or the right and left rear wheels are paired, further accurate control of a yaw moment is possible.

Moreover, according to the sixth aspect of the present invention, the brake-fluid-pressure control means includes the regulator valve for regulating the brake fluid pressure generated by the electric brake-fluid-pressure generation means, and the control valve capable of individually controlling the brake fluid pressure regulated by the regulator valve. With this configuration, the brake fluid pressure from the electric brake-fluid-pressure generation means can be accurately regulated, and the wheel cylinders can operate with excellent responsiveness.

EXPLANATION OF REFERENCE NUMERALS AND SYMBOLS

16 Wheel cylinder
17 Wheel cylinder
20 Wheel cylinder
21 Wheel cylinder
23 Slave cylinder (electric brake-fluid-pressure generation means)
24 VSA system (brake-fluid-pressure control means)
Sa Stroke sensor (brake-operation-amount detection means)

BEST MODE FOR CARRYING OUT THE INVENTION

A first embodiment of the present invention is explained below based on FIG. 1 to FIG. 3.

First Embodiment

Figure 1:
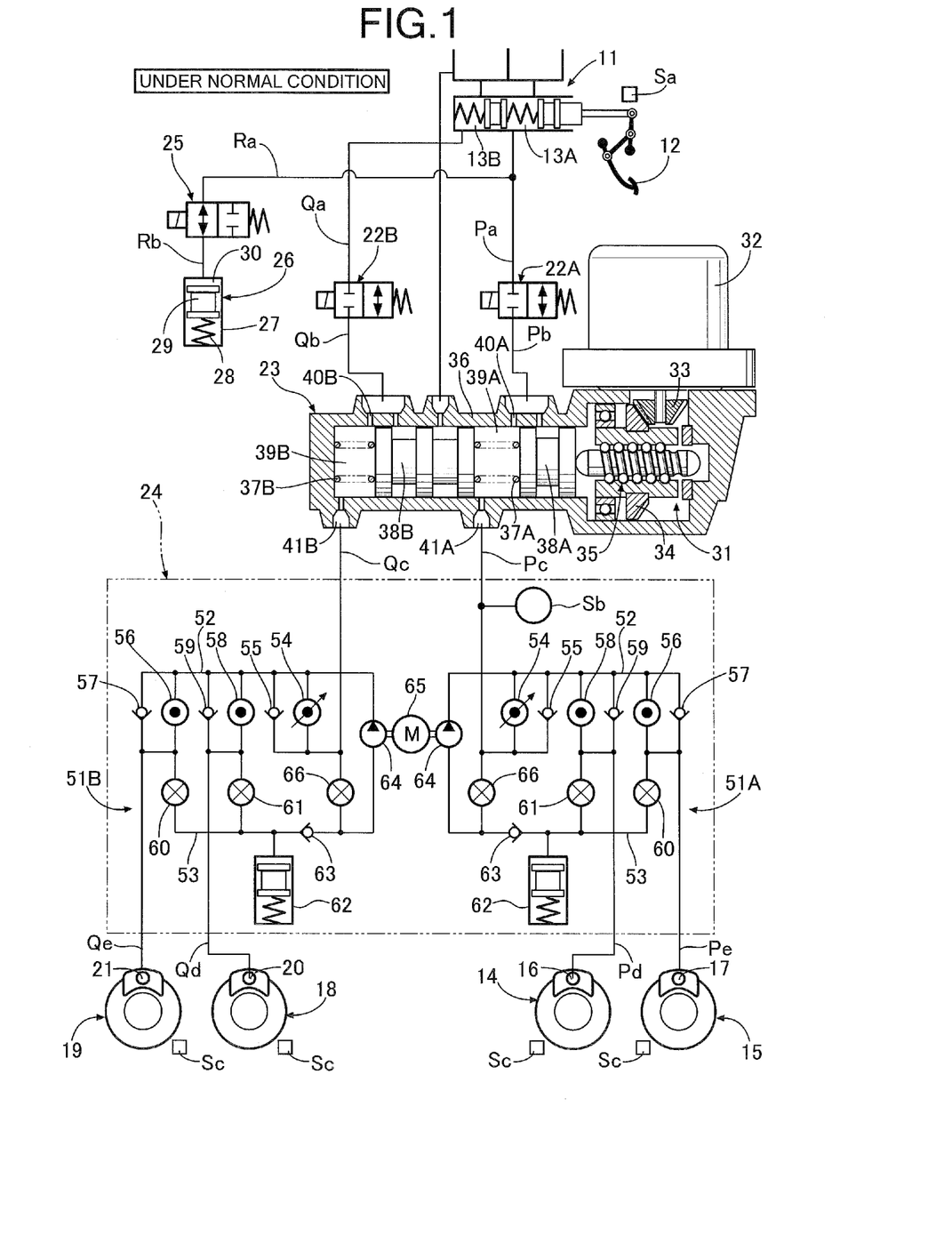
FIG. 1 is a diagram of a fluid pressure circuit of a BBW brake device under a normal condition. (first embodiment)

As shown in FIG. 1, a tandem master cylinder 11 includes rear and front fluid pressure chambers 13A and 13B that output a brake fluid pressure corresponding to a depressing force from a driver depressing a brake pedal 12, the rear fluid pressure chamber 13A is connected to, for example, wheel cylinders 16 and 17 of disk brake devices 14 and 15 of a left front wheel and a right rear wheel via fluid paths Pa, Pb, Pc, Pd, and Pe (first system), and the front fluid pressure chamber 13B is connected to, for example, wheel cylinders 20 and 21 of disk brake devices 18 and 19 of a right front wheel and a left rear wheel via fluid paths Qa, Qb, Qc, Qd, and Qe (second system).

A cut-off valve 22A, which is a normally open electromagnetic valve, is disposed between the fluid paths Pa and Pb, a cut-off valve 22B, which is a normally open electromagnetic valve, is disposed between the fluid paths Qa and Qb, a slave cylinder 23 is disposed between the fluid paths Pb and Qb and the fluid paths Pc and Qc, and a VSA (vehicle stability assist) system 24 is disposed between the fluid paths Pc and Qc and the fluid paths Pd and Pe; Qd and Qe.

A stroke simulator 26 is connected to fluid paths Ra and Rb branching from the fluid path Pa via a reaction force allowing valve 25, which is a normally closed electromagnetic valve. The stroke simulator 26 is one in which a piston 29 urged by means of a spring 28 is slidably fitted into a cylinder 27, and a fluid pressure chamber 30 formed on the opposite side of the piston 29 to the spring 28 communicates with the fluid path Rb.

An actuator 31 of the slave cylinder 23 includes an electric motor 32, a drive bevel gear 33 provided on an output shaft thereof, a driven bevel gear 34 meshing with the drive bevel gear 33, and a ball screw mechanism 35 that is operated by the driven bevel gear 34.

A rear piston 38A and a front piston 38B urged in the backward direction by return springs 37A and 37B respectively are slidably disposed in a rear part and a front part of a cylinder main body 36 of the slave cylinder 23, and a rear fluid pressure chamber 39A and a front fluid pressure chamber 39B are defined in front of the rear piston 38A and the front piston 38B respectively.

The rear fluid pressure chamber 39A communicates with the fluid path Pb via a rear input port 40A and communicates with the fluid path Pc via a rear output port 41A, and the front fluid pressure chamber 39B communicates with the fluid path Qb via a front input port 40B and communicates with the fluid path Qc via a front output port 41B.

In FIG. 1, when the electric motor 32 is driven in one direction, the rear and front pistons 38A and 38B are moved forward via the drive bevel gear 33, the driven bevel gear 34, and the ball screw mechanism 35. Accordingly, a brake fluid pressure is generated in the rear and front fluid pressure chambers 39A and 39B, thus enabling the brake fluid pressure to be outputted to the fluid paths Pc and Qc via the rear and front output ports 41A and 41B.

The structure of the VSA system 24 is known and employs the same structure for a first brake actuator 51A for controlling the first system of the disk brake devices 14 and 15 for the left front wheel and the right rear wheel and for a second brake actuator 51B for controlling the second system of the disk brake devices 18 and 19 for the right front wheel and the left rear wheel.

The first brake actuator 51A for the first system of the disk brake devices 14 and 15 for the left front wheel and the right rear wheel is explained below as being representative thereof.

The first brake actuator 51A is disposed between the fluid path Pc communicating with the rear output port 41A of the slave cylinder 23 positioned on the upstream side and the fluid paths Pd and Pe communicating respectively with the wheel cylinders 16 and 17 of the left front wheel and the right rear wheel positioned on the downstream side.

The first brake actuator 51A includes a fluid path 52 and a fluid path 53 in common for the wheel cylinders 16 and 17 of the left front wheel and the right rear wheel, and includes a regulator valve 54, which is a normally open electromagnetic valve with a variable degree of opening, disposed between the fluid path Pc and the fluid path 52, a check valve 55 disposed in parallel to the regulator valve 54 and allowing flow of brake fluid from the fluid path Pc side to the fluid path 52 side, an in-valve 56, which is a normally open electromagnetic valve, disposed between the fluid path 52 and the fluid path Pe, a check valve 57 disposed in parallel to the in-valve 56 and allowing flow of brake fluid from the fluid path Pe side to the fluid path 52 side, an in-valve 58, which is a normally open electromagnetic valve, disposed between the fluid path 52 and the fluid path Pd, a check valve 59 disposed in parallel to the in-valve 58 and allowing flow of brake fluid from the fluid path Pd side to the fluid path 52 side, an out-valve 60, which is a normally closed electromagnetic valve, disposed between the fluid path Pe and the fluid path 53, an out-valve 61, which is a normally closed electromagnetic valve, disposed between the fluid path Pd and the fluid path 53, a reservoir 62 connected to the fluid path 53, a check valve 63 disposed between the fluid path 53 and the fluid path 52 and allowing flow of brake fluid from the fluid path 53 side to the fluid path 52 side, a pump 64 disposed between the check valve 63 and the fluid path 52 and supplying brake fluid from the fluid path 53 side to the fluid path 52 side, an electric motor 65 for driving the pump 64, and a suction valve 66, which is a normally closed electromagnetic valve, disposed between the fluid path Pc and a position between the check valve 63 and the pump 64.

Here, the electric motor 65 is shared by the pumps 64 and 64 of the first and second brake actuators 51A and 51B, but it is possible to provide electric motors 65 and 65 that are exclusively used for the pumps 64 and 64 respectively.

To the brake pedal 12, a stroke sensor Sa for detecting a stroke of the brake pedal 12 is provided. A fluid pressure sensor Sb for detecting a brake fluid pressure generated by the slave cylinder 23 is provided to the fluid path Pc on one entrance side of the VSA system 24, and vehicle speed sensors Sc are provided respectively to the four wheels.

Next, operations of the first embodiment of the present invention including the above-described configuration will be described.

In a normal state where the system operates normally, the cut-off valves 22A and 22B, which are normally open electromagnetic valves, are closed by being energized, and the reaction force allowing valve 25, which is a normally closed electromagnetic valve, is opened by being energized, as shown in FIG. 1. When the stroke sensor Sa detects, in this state, that the driver is depressing the brake pedal 12, the electric motor 32 of the slave cylinder 23 starts to operate, the rear and front pistons 38A and 38B advance, and thereby a brake fluid pressure is generated in each of the rear and front fluid pressure chambers 39A and 39B. These brake fluid pressures are transmitted to the wheel cylinders 16 and 17; 20 and 21 of the disk brake devices 14 and 15; 18 and 19 through the opened in-valves 56 and 56; 58 and 58 of the VSA system 24, to brake the wheels.

In this state, since the communication between the master cylinder 11 and the slave cylinder 23 is cut off by the cut-off valves 22A and 22B thus closed, a brake fluid pressure generated by the master cylinder 11 is not transmitted to the disk brake devices 14 and 15; 18 and 19. Accordingly, the brake fluid pressure generated in the fluid pressure chamber 13 of the master cylinder 11 is transmitted to the fluid pressure chamber 30 of the stroke simulator 26 through the opened reaction force allowing valve 25, to thereby move the piston 29 against the spring 28. This allows the brake pedal 12 to stroke, and can also resolve strange feeling experienced by the driver by generating a pseudo pedal reaction force.

Figure 3:
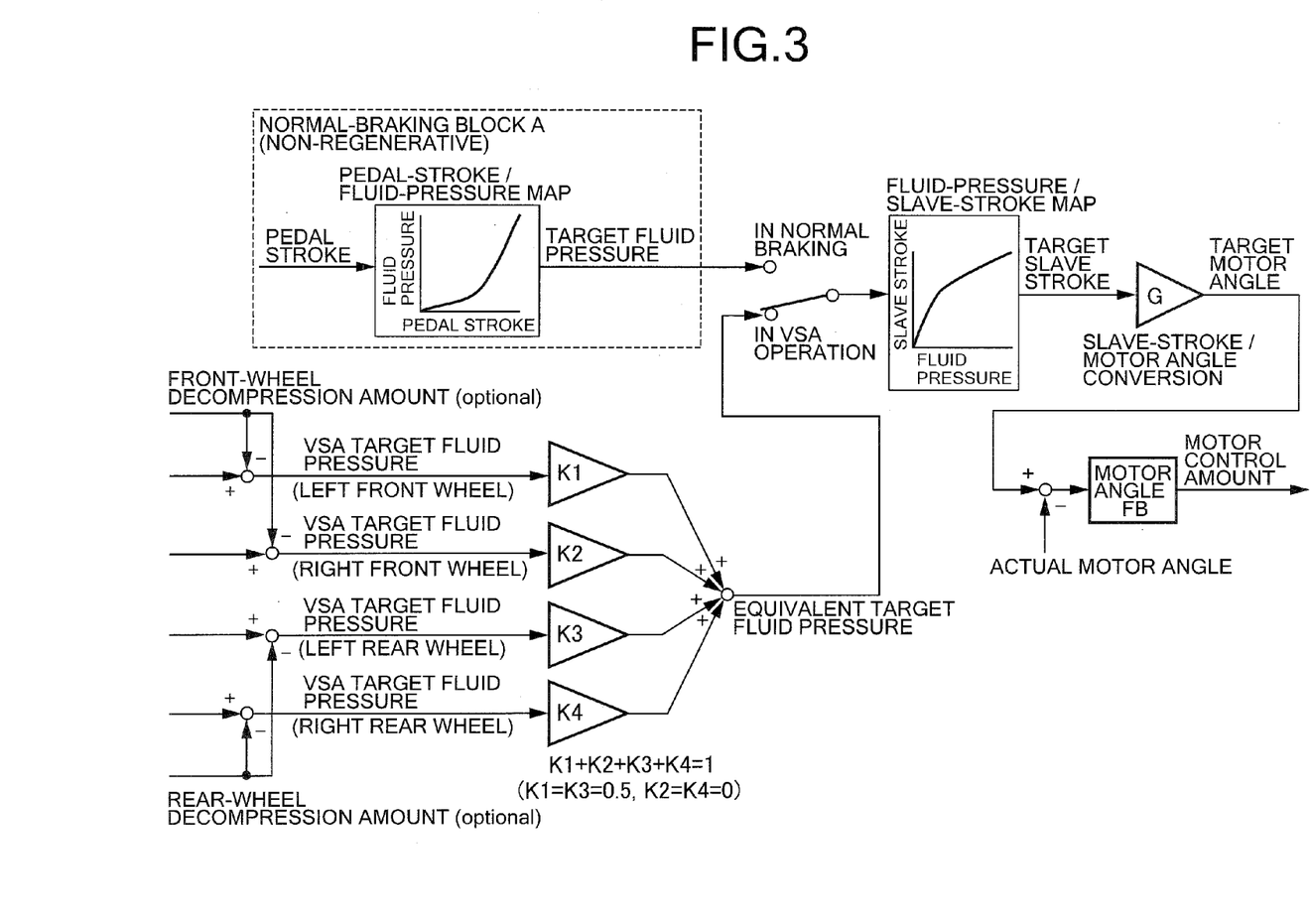
FIG. 3 is a block diagram of a control circuit of a slave cylinder. (first embodiment)

In this state, as shown in FIG. 3, a target fluid pressure is searched out based on the stroke, detected by the stroke sensor Sa, of the brake pedal 12, by using a pedal-stroke/fluid-pressure map, a target stroke of the slave cylinder 23 is further searched out based on the target fluid pressure by using a fluid-pressure/slave-cylinder-stroke map, and the target stroke is converted to a target rotation angle of the electric motor 32 of the slave cylinder 23. Then, by controlling a rotation angle of the electric motor 32 so that an actual rotation angle of the electric motor 32 and the target rotation angle would have no difference, a fluid pressure corresponding to the stroke of the brake pedal 12 can be generated by the slave cylinder 23 and supplied to the wheel cylinders 16 and 17; 20 and 21.

Next, operations of the VSA system 24 will be described based on FIG. 1.

In general, the pumps 64 and 64 generate brake fluid pressures for causing the VSA system 24 to operate. In this embodiment, however, the slave cylinder 23, instead of the pumps 64 and 64, generates a brake fluid pressure for causing the VSA system 24 to operate. The pumps 64 and 64 of the VSA system 24 operate only when the VSA system 24 performs an ABS function.

When the VSA system 24 is not in operation, the regulator valves 54 and 54 are opened by being deenergized, the suction valves 66 and 66 are closed by being deenergized, the in-valves 56 and 56; 58 and 58 are opened by being deenergized, and the out-valves 60 and 60; 61 and 61 are closed by being deenergized. Accordingly, when the driver depresses the brake pedal 12 for braking and the slave cylinder 23 starts to operate, brake fluid pressures outputted from the rear and front output ports 41A and 41B of the slave cylinder 23 are supplied to the wheel cylinders 16 and 17; 20 and 21 through the regulator valves 54 and 54 and then the opened in-valves 56 and 56; 58 and 58, which can thereby brake the four wheels.

When the VSA system 24 is in operation, the slave cylinder 23 is caused to operate in a state where the suction valves 66 and 66 are closed by being deenergized and the regulator valves 54 and 54 are opened by being deenergized, and a brake fluid supplied from the slave cylinder 23 is supplied to the in-valves 56 and 56; 58 and 58 through the regulator valves 54 and 54. Accordingly, by selectively transmitting the brake fluid pressure from the slave cylinder 23 to the wheel cylinders 16 and 17; 20 and 21 through the in-valves 56 and 56; 58 and 58 that are opened by being energized, braking forces for the four wheels can be individually controlled even when the driver is not depressing the brake pedal 12.

With the configuration of individually controlling the braking forces for the four wheels by the first and second brake actuators 51A and 51B, turning performance can be enhanced by increasing braking forces of inner wheels at a time of turning, and turning stability performance (direction stability performance) can be enhanced by increasing braking forces of outer wheels at a time of turning.

Control of the slave cylinder 23 when the above-described VSA system 24 is in operation will be described based on FIG. 3.

A VSA target fluid pressure inputted by an ECU of the VSA system 24 is a total brake fluid pressure, required to cause the VSA system 24 to operate, for the four wheels. For example, to generate a yaw moment in a left-turning direction by braking the left front wheel and the left rear wheel with the same braking force, an equivalent target fluid pressure is calculated by adding a value obtained by multiplying the VSA target fluid pressure by an equivalent target fluid pressure conversion factor K1 (=0.5) for the left front wheel and a value obtained by multiplying the VSA target fluid pressure by an equivalent target fluid pressure conversion factor K3 (=0.5) for the left rear wheel.

Four equivalent target fluid pressure conversion factors K1 to K4 are set to satisfy K1=K3=0.5 and K2=K4=0. Accordingly, the equivalent target fluid pressure conversion factor K2 for the right front wheel and the equivalent target fluid pressure conversion factor K4 for the right rear wheel, which are not braked, are both 0, and the VSA target fluid pressure is equal to the equivalent target fluid pressure.

In this way, by searching out the target stroke of the slave cylinder 23 from the fluid-pressure/slave-cylinder-stroke map by using the equivalent target fluid pressure in a VSA operating state, instead of the target fluid pressure searched out from the pedal-stroke/fluid-pressure map in a normal braking state, the slave cylinder 23 is caused to operate in the same way as in a normal braking state. Moreover, supplying, using the VSA system 24, the brake fluid pressure generated by the slave cylinder 23 only to the wheel cylinders 16 and 21 of the left front wheel and the left rear wheel, can brake only the left front wheel and the left rear wheel.

Figure 4:
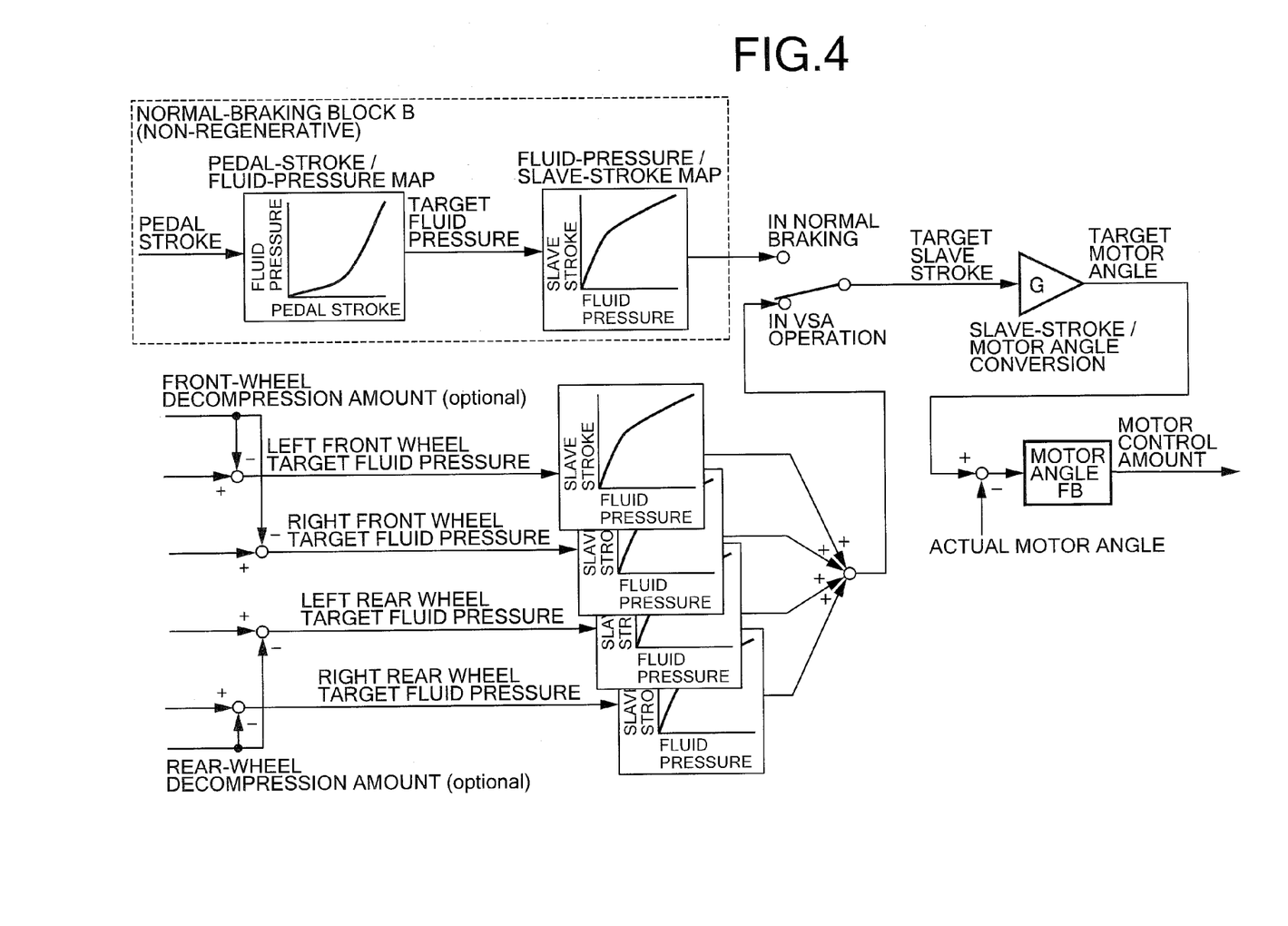
FIG. 4 is a block diagram of a control circuit of a slave cylinder. (second embodiment)

Next, a second embodiment of control of a slave cylinder 23 when the above-described VSA system 24 is in operation will be described based on FIG. 4.

Second Embodiment

The first embodiment described using FIG. 3 has the following problem. If the load fluid loss characteristics show strong nonlinearity, a large error occurs between the operation amount, required for VSA control, of the slave cylinder 23 and the operation amount, calculated from the equivalent target fluid pressure, of the slave cylinder 23. This error reduces the accuracy of the brake fluid pressure generated by the slave cylinder 23.

In view of this problem, in the second embodiment, a target fluid pressure, inputted by a control device of a VSA system 24, for each wheel is converted to a target stroke of a slave cylinder 23 by applying the target fluid pressure to a fluid-pressure/slave-cylinder-stroke map, and the four target strokes of the slave cylinder 23 are added to calculate an ultimate target stroke of the slave cylinder 23.

According to this second embodiment, an influence of the nonlinearity of load fluid loss characteristics can be eliminated, and hence a brake fluid pressure required when the VSA system 24 is in operation can be further accurately generated in the slave cylinder 23.

Figure 5:
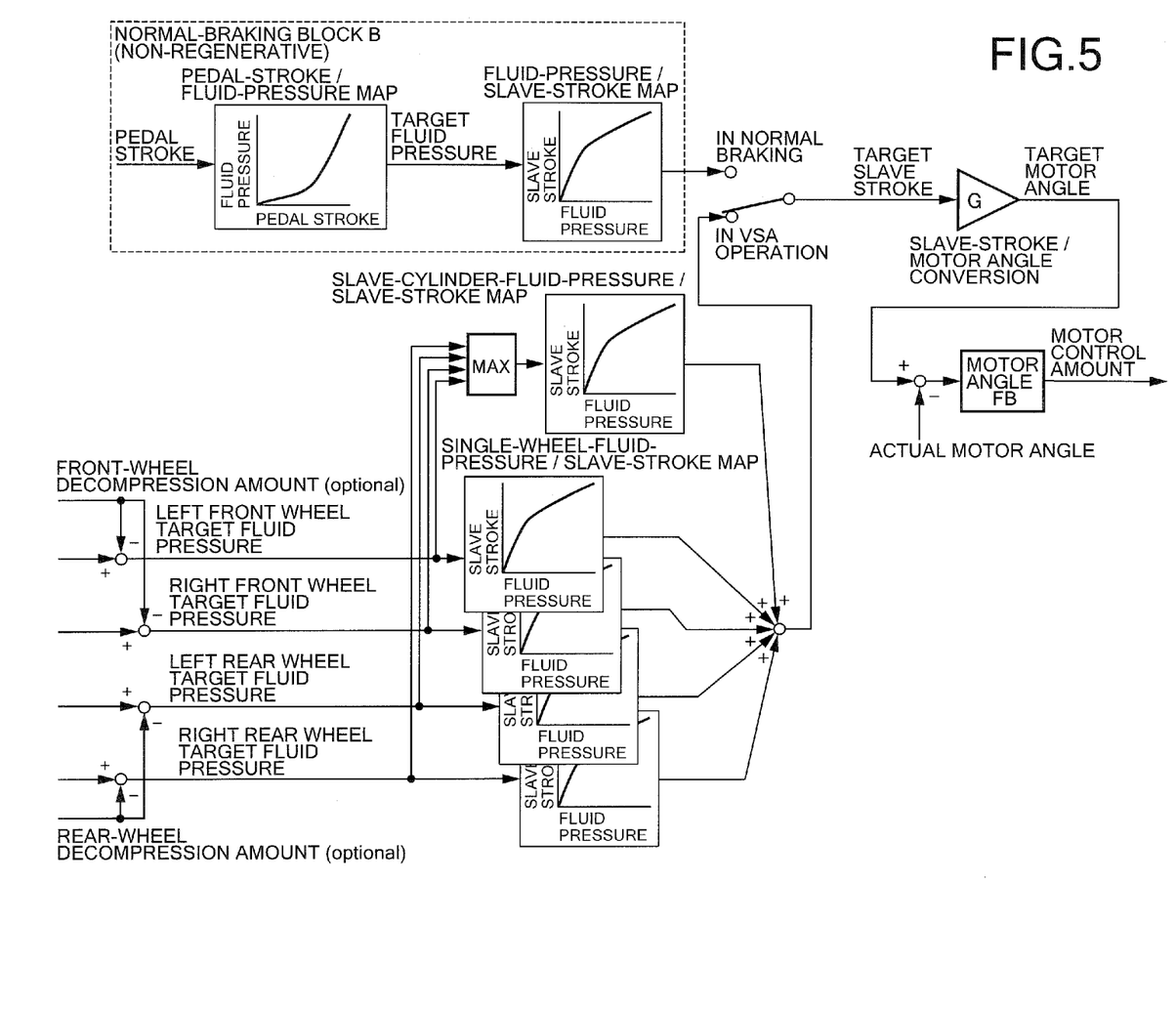
FIG. 5 is a block diagram of a control circuit of a slave cylinder. (third embodiment)

Next, a third embodiment of control of a slave cylinder 23 when the above-described VSA system 24 is in operation will be described based on FIG. 5.

Third Embodiment

The third embodiment is a modification of the second embodiment. In the second embodiment, when the slave cylinder 23 is used to brake multiple wheels, the brake fluid pressure generated by the salve cylinder 23 may become insufficient due to fluid loss occurring in the salve cylinder 23 and wheel cylinders 16 and 17; 20 and 21 in some cases.

To address this problem, the largest one of target fluid pressures for four wheels is selected by means of high select, and the largest target fluid pressure is converted to a target stroke of a slave cylinder 23 by being applied to a fluid-pressure/slave-cylinder-stroke map. A value obtained by adding the target stroke, corresponding to the largest target fluid pressure, of the slave cylinder 23 to the total value of four target strokes, corresponding respectively to the four wheels, of the slave cylinder 23 is set as an ultimate target stroke of the slave cylinder 23.

According to this third embodiment, the target stroke, corresponding to the largest one of the target fluid pressures for the four wheels, of the slave cylinder 23 compensates fluid loss in the slave cylinder 23 and wheel cylinders 16 and 17; 20 and 21, that is, fluid loss due to deformation of cup seals, bulges of a brake line or the like. Hence, a brake fluid pressure required when a VSA system 24 is in operation can be further accurately generated in the slave cylinder 23.

Next, a fourth embodiment of control of a slave cylinder 23 in regenerative braking will be described based on FIG. 6. It should be noted that fourth to sixth embodiments are intended for a hybrid vehicle or an electric vehicle having right and left front wheels, right and left rear wheels or the four wheels connected to a motor generator and being capable of regenerative braking. In such a vehicle, regenerative braking is preferentially employed for the wheels to which regenerative braking is applicable, and fluid pressure braking is employed when a braking force generated only by the regenerative braking is insufficient. In the case of employing fluid pressure braking, since the necessary amount of a fluid pressure braking force is different between each wheel connected to the motor generator and each wheel not connected to the motor generator, a fluid pressure braking force for each wheel is individually controlled by a VSA system 24.

Fourth Embodiment

In this embodiment, a target fluid pressure is searched out from a pedal-stroke/fluid-pressure map, for each of a driver-requested fluid pressure for a front axle and a driver-requested fluid pressure for a rear axle. Meanwhile, an ECU, to which a regenerative torque limit (maximum value of a regenerative torque) determined based on a battery charge state or the like is inputted, for regenerative control outputs a regenerative torque, a decompression amount for the front axle and a decompression amount for the rear axle. The decompression amount for the front axle corresponds to a brake fluid pressure for the front axle that is reduced when the front axle is subjected to regenerative braking, while the decompression amount for the rear axle corresponds to a brake fluid pressure for the rear axle that is reduced when the rear axle is subjected to regenerative braking. Reducing a braking force generated by fluid pressure braking by an amount corresponding to a braking force generated by regenerative braking in this way can prevent the total braking force from changing.

The target fluid pressure for the front axle obtained by subtracting the decompression amount for the front axle outputted by the ECU for regenerative control from the driver-requested fluid pressure for the front axle searched out from the pedal-stroke/fluid-pressure map is multiplied by an equivalent target fluid pressure conversion factor Kf and is thereby converted to an equivalent target fluid pressure for the front axle. Similarly, the target fluid pressure for the rear axle obtained by subtracting the decompression amount for the rear axle outputted by the ECU for regenerative control from the driver-requested fluid pressure for the rear axle searched out from the pedal-stroke/fluid-pressure map is multiplied by an equivalent target fluid pressure conversion factor Kr and is thereby converted to an equivalent target fluid pressure for the rear axle. The equivalent target fluid pressure conversion factor Kf and the equivalent target fluid pressure conversion factor Kr are set to satisfy Kf+Kr=1.

Then, the total value of the equivalent target fluid pressure for the front axle and the equivalent target fluid pressure for the rear axle is applied to a fluid-pressure/slave-cylinder-stroke map to search out a target stroke of the slave cylinder 23, and the target stroke is converted to a target rotation angle of an electric motor 32 for the slave cylinder 23. By controlling the rotation angle of the electric motor 32 so that an actual rotation angle of the electric motor 32 and the target rotation angle would have no difference, the total brake fluid pressure required for the wheel cylinders 16 and 17; 20 and 21 can be generated in the slave cylinder 23.

Figure 7:
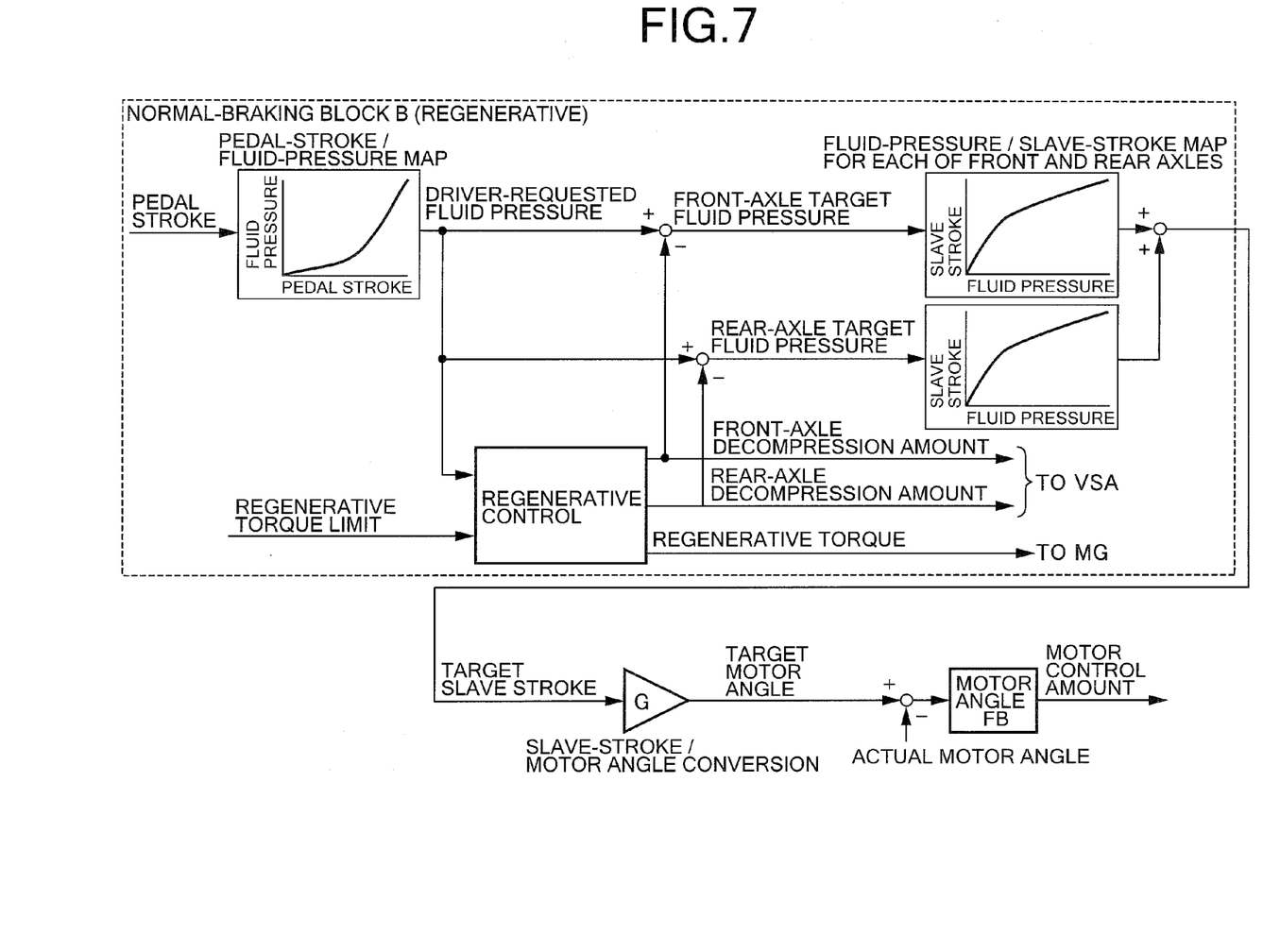
FIG. 7 is a block diagram of a control circuit of a slave cylinder. (fifth embodiment)

Next, a fifth embodiment of control of a slave cylinder 23 in regenerative braking will be described based on FIG. 7.

Fifth Embodiment

Figure 6:
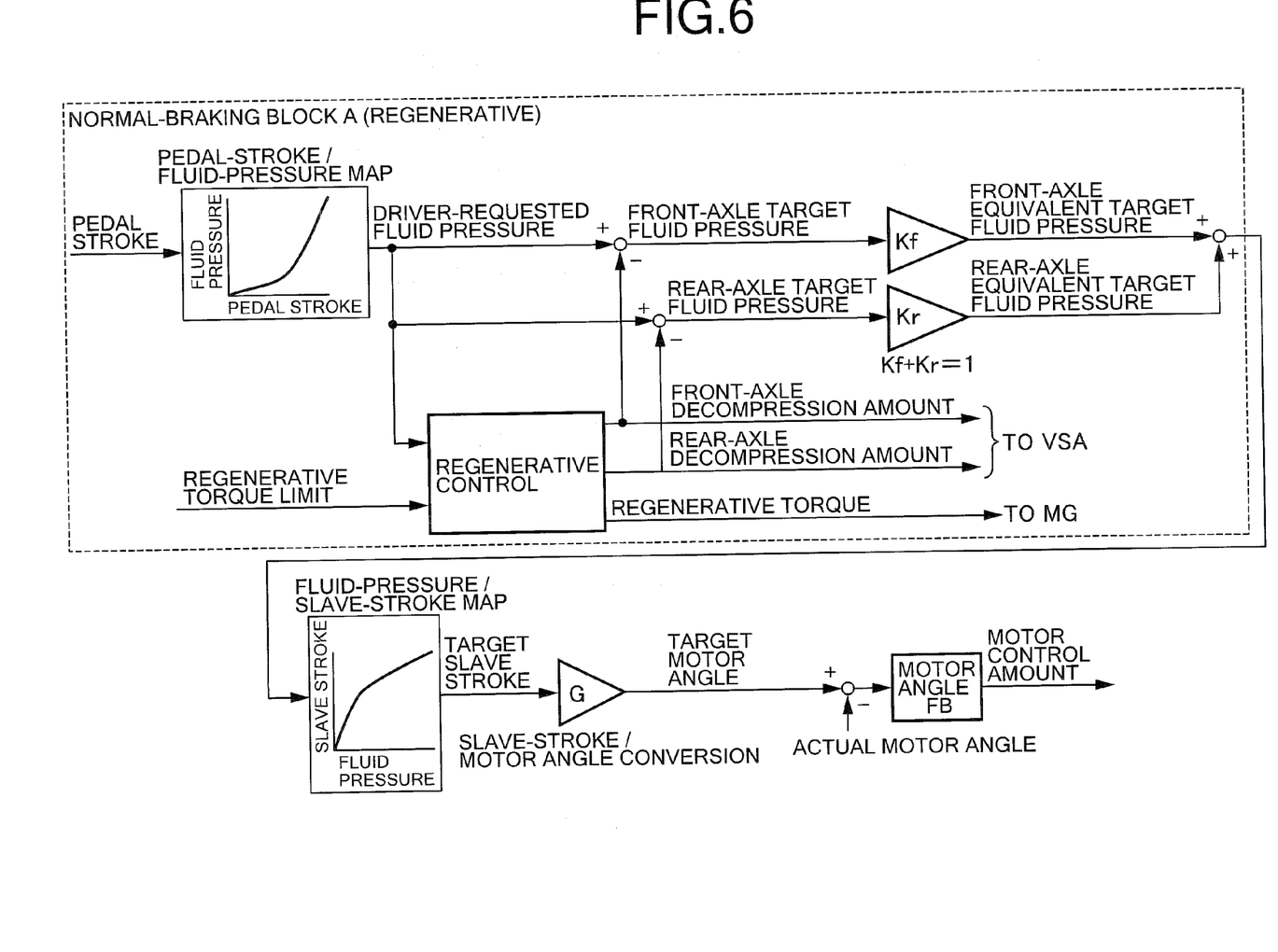
FIG. 6 is a block diagram of a control circuit of a slave cylinder. (fourth embodiment)

The fourth embodiment described using FIG. 6 has the following problem. If the load fluid loss characteristics show strong nonlinearity, a large error occurs between the operation amount, required for individual control of fluid pressure braking forces for the front and rear axles, of the slave cylinder 23 and the operation amount, calculated from the equivalent target fluid pressures, of the slave cylinder 23. This error reduces the accuracy of the brake fluid pressure generated by the slave cylinder 23.

In view of this problem, in the fifth embodiment, each of target fluid pressure for the front and rear axles determined respectively in consideration of regenerative braking amounts of the front and rear axles is converted to a target stroke of a slave cylinder 23 by being applied to a corresponding fluid-pressure/slave-cylinder-stroke map, and the two target strokes of the slave cylinder 23 are added to calculate an ultimate target stroke of the slave cylinder 23.

According to this fifth embodiment, an influence of the nonlinearity of load fluid loss characteristics can be eliminated, and hence a brake fluid pressure required in regenerative braking can be further accurately generated in the slave cylinder 23.

Next, a sixth embodiment of control of a slave cylinder 23 in regenerative braking will be described based on FIG. 8.

Sixth Embodiment

The sixth embodiment is a modification of the fifth embodiment. In the fifth embodiment, when the slave cylinder 23 is used to brake the front and rear axles, the brake fluid pressure generated by the salve cylinder 23 may become insufficient due to fluid loss occurring in the salve cylinder 23 and wheel cylinders 16 and 17; 20 and 21 in some cases.

To address this problem, the largest one of target fluid pressures for front and rear axles is selected by means of high select, and the largest target fluid pressure is converted to a target stroke of a slave cylinder 23 by being applied to a fluid-pressure/slave-cylinder-stroke map. A value obtained by adding the target stroke, corresponding to the largest target fluid pressure, of the slave cylinder 23 to the total value of two target strokes, corresponding respectively to the front and rear axles, of the slave cylinder 23 is set as an ultimate target stroke of the slave cylinder 23.

According to this sixth embodiment, the target stroke, corresponding to the largest one of the target fluid pressures for the front and rear axles, of the slave cylinder 23 compensates an amount corresponding to fluid loss in the slave cylinder 23 and wheel cylinders 16 and 17; 20 and 21. Hence, a brake fluid pressure required in regenerative braking can be further accurately generated in the slave cylinder 23.

Although the above-described first to third embodiments are intended for a vehicle that does not perform regenerative braking, the embodiments are applicable to a vehicle that performs regenerative braking. A concrete configuration for this case will be described below.

In the first embodiment (see FIG. 3), what is needed is to make a compensation by subtracting a decompression amount corresponding to a regenerative braking force for each of the wheels from a VSA target fluid pressure for the wheel, and replace a normal-braking block A (non-regenerative) surrounded with a broken-line frame, with a normal-braking block A (regenerative) in the fourth embodiment (see FIG. 6).

Figure 8:
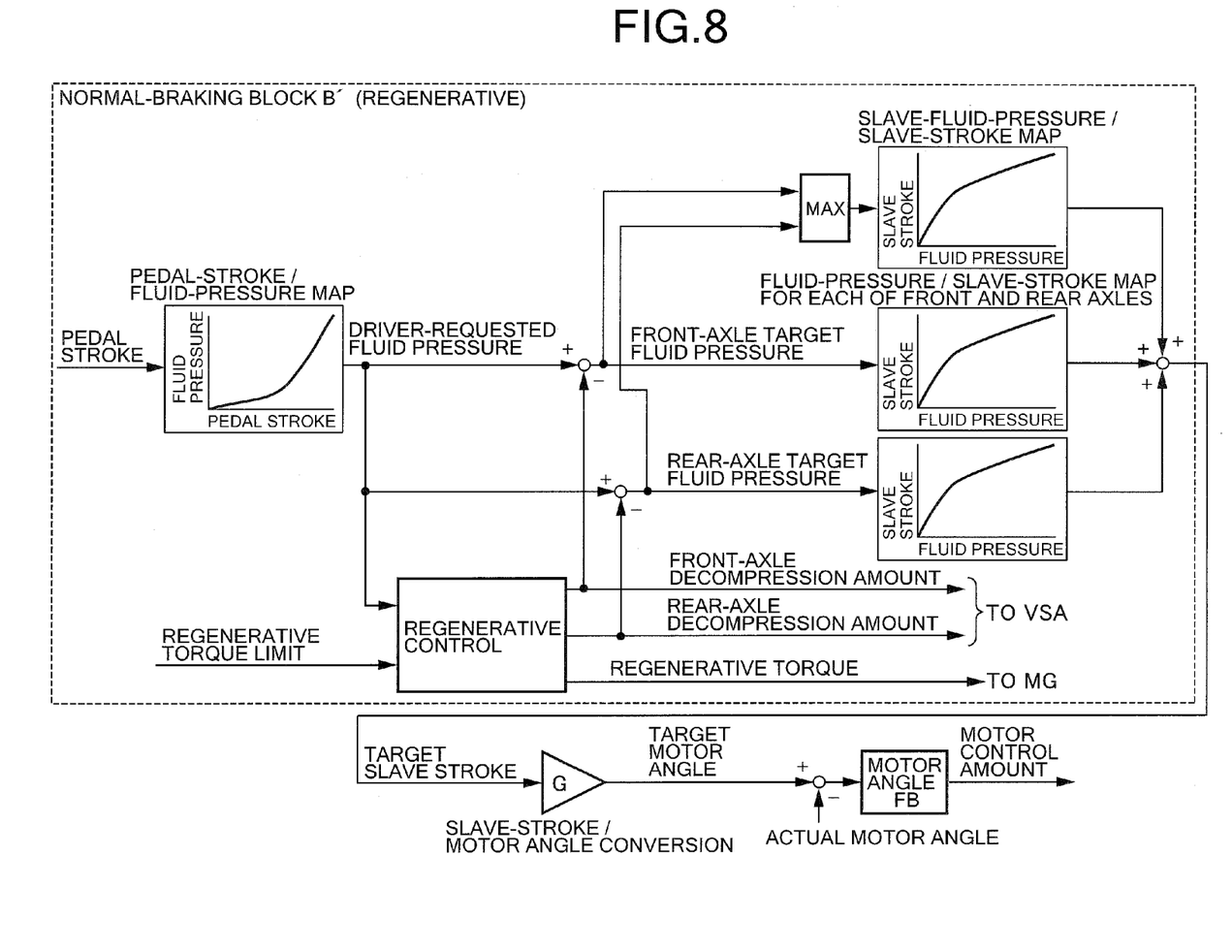
FIG. 8 is a block diagram of a control circuit of a slave cylinder. (sixth embodiment)

In the second embodiment (see FIG. 4), what is needed is to make a compensation by subtracting a decompression amount corresponding to a regenerative braking force for each of the wheels from a VSA target fluid pressure for the wheel, and replace a normal-braking block B (non-regenerative) surrounded with a broken-line frame, with a normal-braking block B (regenerative) in the fifth embodiment (see FIG. 7) or a normal-braking block B' (regenerative) in the sixth embodiment (see FIG. 8).

In the third embodiment (see FIG. 5), what is needed is to make a compensation by subtracting a decompression amount corresponding to a regenerative braking force for each of the wheels from a VSA target fluid pressure for the wheel, and replace a normal-braking block B (non-regenerative) surrounded with a broken-line frame, with a normal-braking block B (regenerative) in the fifth embodiment (see FIG. 7) or a normal-braking block B' (regenerative) in the sixth embodiment (see FIG. 8).

In the above-described first to sixth embodiments, to individually control braking forces for the four wheels along with operation of the VSA system 24, or to individually control braking forces for the front and rear axles along with application of regenerative braking, a brake fluid pressure generated by the slave cylinder 23 and having low pulsation is used instead of a brake fluid pressure generated by the pumps 64 and 64 of the VSA system 24 and having high pulsation. This configuration allows the wheel cylinders 16 and 17; 20 and 21 for the four wheels to operate smoothly and can consequently increase brake feeling. Moreover, a brake fluid pressure obtained by adding brake fluid pressures required for the four wheels, or a brake fluid pressure obtained by further adding an amount corresponding to fluid loss to the total value, is generated in the slave cylinder 23. With this configuration, a necessary and sufficient brake fluid pressure can be accurately generated in the slave cylinder 23.

Next, operations of ABS (anti-lock braking system) control using the VSA system 24 will be described.

If it is detected, based on outputs from the vehicle speed sensors Sc, that the left front wheel, for example, comes to travel on a path having a low coefficient of friction and has a tendency to lock during braking by the driver depressing the brake pedal 12, a brake fluid pressure in the wheel cylinder 16 for the left front wheel is let out to the corresponding reservoir 62 to reduce the pressure to a predetermined level by energizing and closing one of the in-valves 58 of the first brake actuator 51A while energizing and opening one of the out-valves 61. Subsequently, the brake fluid pressure in the wheel cylinder 16 for the left front wheel is maintained by deenergizing and closing the out-valve 61. When the tendency to lock of the wheel cylinder 16 for the left front wheel is reduced as a result of this, a brake fluid pressure from the rear output port 41A of the slave cylinder 23 is supplied to the wheel cylinder 16 for the left front wheel by deenergizing and opening the in-valve 58, to thereby increase the pressure to a predetermine level. In this way, a braking force is increased.

If the left front wheel has a tendency to lock again as a consequence of this increase of the pressure, by repeating the above-described reduction of the pressure→maintenance of the pressure→increase of the pressure, it is possible to perform ABS control for minimizing a braking distance while reducing the lock level of the left front wheel.

As described above, in the embodiments, the pumps 64 and 64 of the VSA system 24 operate only when brake fluids stored in the reservoirs 62 and 62 are to be sent back to the slave cylinder 23 side.

The descriptions have been given above of the ABS control for the case in which the wheel cylinder 16 for the left front wheel has a tendency to lock. However, a similar ABS control can be performed also in a case where any one of the wheel cylinder 17 for the right rear wheel, the wheel cylinder 20 for the right front wheel and the wheel cylinder 21 for the left rear wheel has a tendency to lock.

Incidentally, if the slave cylinder 23 comes to be inoperable due to an error in a power source or the like, braking is performed using a brake fluid pressure generated by the master cylinder 11 instead of a brake fluid pressure generated by the slave cylinder 23.

Figure 2:
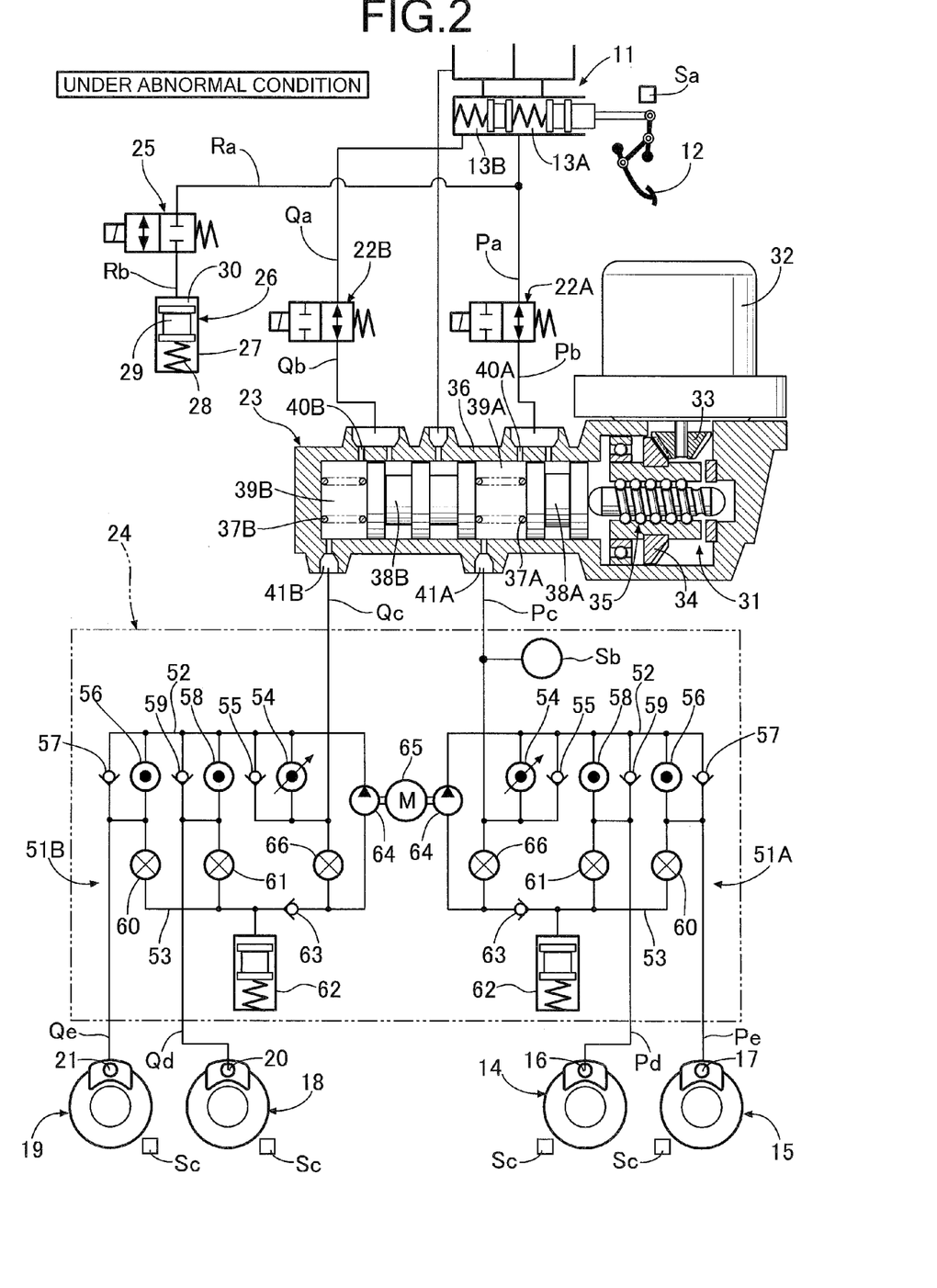
FIG. 2 is a diagram of a fluid pressure circuit, corresponding to FIG. 1, under an abnormal condition. (first embodiment)

Specifically, as shown in FIG. 2, when an error occurs in the power source, the cut-off valves 22A and 22B, which are normally open electromagnetic valves, are automatically opened and the reaction force allowing valve 25, which is a normally closed electromagnetic valve, is automatically closed. In this state, brake fluid pressures generated in the rear and front fluid pressure chambers 13A and 13B of the master cylinder 11 pass the rear fluid pressure chamber 39A and the front fluid pressure chamber 39B of the slave cylinder 23 to then operate the wheel cylinders 16 and 17; 20 and 21 of the disk brake devices 14 and 15; 18 and 19 for the wheels, without being absorbed into the stroke simulator 26. Thus, braking forces can be generated without any problem.

Embodiments of the present invention have been described above. However, the present invention may be modified in a variety of ways as long as the modifications do not depart from the gist of the present invention.

For example, the amount of brake operation by the driver is detected by the stroke sensor Sa of the brake pedal 12 in the embodiments, but may be detected by a pedal pressure sensor of the brake pedal 12.

Moreover, electric brake-fluid-pressure generation means of the present invention is not limited to the slave cylinder 23 in the embodiments, but is desirable to be one that generates lower pulsation than that generated by the pumps 64 and 64 of the VSA system 24.

Moreover, the equivalent target fluid pressure conversion factors Kf and Kr are set respectively for the front axle and the rear axle in the fourth embodiment (see FIG. 6), but equivalent target fluid pressure conversion factors may be set respectively for the wheels.

Moreover, the fluid-pressure/slave-cylinder-stroke maps are set respectively for the front axle and the rear axle in the fifth and sixth embodiments (see FIG. 7 and FIG. 8), but fluid-pressure/slave-cylinder-stroke maps may be set respectively for the wheels.

The invention claimed is:

1. A BBW brake device including:
wheel cylinders provided respectively to wheels and each configured to generate a braking force by using a brake fluid pressure;
a brake-operation-amount detection device for detecting an amount of brake operation by a driver;
an electric brake-fluid-pressure generation device for supplying, to the wheel cylinders, a brake fluid pressure electrically generated in accordance with the amount of brake operation; and
a brake-fluid-pressure control device, disposed between the electric brake-fluid-pressure generation device and the wheel cylinders, for controlling vehicle behavior by individually controlling brake fluid pressures supplied to the wheel cylinders;
a reservoir configured to store brake fluid therein; and
a pump for generating brake fluid pressure, and the pump is operated only during an antilock braking operation
wherein when the brake-fluid-pressure control device is in operation, a brake fluid pressurized by the electric brake-fluid-pressure generation device which corresponds to the brake fluid pressure required by the wheel cylinders is supplied to the brake-fluid-pressure control device, and
wherein the brake-fluid-pressure control device is a vehicle stability assist (VSA) system which performs a VSA operation in which a yaw movement of the vehicle is controlled by individually controlling brake fluid pressures generated by the electric brake-fluid pressure generation device and supplied respectively to the wheel cylinders during a state in which the driver does not effect a braking operation.

2. The BBW brake device according to claim 1, wherein the electric brake-fluid-pressure generation device generates a brake fluid pressure corresponding to a total of brake fluid pressures required for the plurality of wheel cylinders.

3. The BBW brake device according to claim 2, wherein at least one of the wheel cylinders is provided to at least one of the wheels that is capable of regenerative braking.

4. The BBW brake device according to claim 1, wherein at least one of the wheel cylinders is provided to one of the wheels that is capable of regenerative braking.

5. The BBW brake device according to claim 4, wherein
the at least one wheel capable of regenerative braking is each of right and left front wheels or each of right and left rear wheels, and
the electric brake-fluid-pressure generation device is connected to the wheel cylinders that are on a front-wheel side and the wheel cylinders that are on a rear-wheel side individually through separate fluid paths.

6. The BBW brake device according to claim 1, wherein the electric brake-fluid-pressure generation device generates a brake fluid pressure corresponding to a value obtained by adding a total of brake fluid pressures required for the plurality of wheel cylinders and a fluid pressure corresponding to a highest one of the brake fluid pressures required for the plurality of wheel cylinders.

7. The BBW brake device according to claim 1, wherein the brake-fluid-pressure control device includes:
a regulator valve configured to regulate the brake fluid pressure generated by the electric brake-fluid-pressure generation device; and
a control valve capable of independently controlling the brake fluid pressure regulated by the regulator valve.

8. The BBW brake device according to claim 1, wherein during the VSA operation the electric brake-fluid-pressure generation device is operated based on a VSA target fluid pressure corresponding to a total brake fluid pressure required to cause the VSA system to operate for all of the wheel cylinders.

9. The BBW brake device according to claim 1, wherein during the VSA operation the electric brake-fluid-pressure generation device is operated based on an equivalent target fluid pressure calculated by multiplying a VSA target fluid pressure by an equivalent target fluid pressure conversion factor.

10. The BBW brake device according to claim 1, wherein during the VSA operation an equivalent target fluid pressure is calculated for each of the wheels by multiplying a VSA target fluid pressure for each said wheel by a corresponding equivalent target fluid pressure conversion factor for each said wheel and combining the equivalent target fluid pressures for all of the wheels to generate an equivalent target fluid pressure for the electric brake-fluid-pressure generation device.

* * * * *